ns patent office 2,762,779
Patented Sept. 11, 1956

2,762,779

SOFTENING OF RUBBERS

Arnold R. Davis, Riverside, Conn., assignor to American Cyanamid Company, New York, N. Y., a corporation of Maine No Drawing. Application December 12, 1949, Serial No. 132,633

10 Claims. (Cl. 252—311)

This invention relates to the plasticizing of elastomeric materials. More specifically it relates to the incorporation of plasticizers into elastomeric materials. In particular, it is concerned with a water-dispersible blend of dry powders capable of forming a thixotropic dispersion in water for addition to natural and synthetic latices.

In the manufacture of rubber goods, efficient processing, i. e., milling, calendering, extruding, molding and the like, requires that the rubber be plasticized. This is done in order that production schedules can be met with fewer defective products and with reasonable charges for power, labor and equipment. As a consequence, the plasticizing of rubber has become in itself a highly developed art.

One such procedure is the plasticizing of rubber or synthetic rubbers by the action of hot air or oxygen under suitable conditions. Others are based on the fact that small amounts of chemicals, for example some of the aromatic mercaptans and certain nitroso compounds, can be utilized under various conditions to produce the desired effect. While the exact nature of their action is not completely understood, the use of these chemical plasticizers or "peptizers" has become well known.

From time to time proposals have been made for the addition of these plasticizers and "peptizers" to a latex of the elastomeric material. This was followed by coagulation of the elastomeric solids which were then collected, washed and dried. Such methods of coprecipitation might be expected generally to produce desirable results.

Surprisingly, however, such a practice did not always prove wholly satisfactory. Some plasticizers were sufficiently soluble so that they were removed from the coagulated solids during washing. Others did not distribute satisfactorily through the elastomeric solids. Some had objectionable odors and others had objectionable physiological characteristics. Still others on standing produced changes in the rubber which interfered with subsequent manufacture and use. Some produced heat plasticizing during drying. The storage and shipping of plasticized rubber is unsatisfactory in and of itself.

Recently, a class of plasticizers, i. e., certain o,o'-diacylaminodiphenyldisulfides, were found to be particularly useful. These have the structure

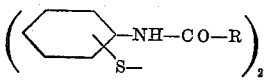

wherein R is an alkyl radical of 2–12 carbon atoms or an aryl radical of 6–12 carbon atoms. R as isopropyl, butyl or phenyl is preferred. Not only do these peptizers exhibit marked plasticizing effect on the elastomer but they are also free from objectionable physiological characteristics. Further, unplasticized mixtures with elastomers, such as natural rubber, were found to be capable of storage for long periods of time without exhibiting changes in the elastomer. In the copending application of the present inventor with B. W. Henderson, Serial No. 680,094, filed June 28, 1946, now U. S. Patent 2,618,620, entitled "Softening of Rubbers," it is suggested that these plasticizers, which are solids, be made into an aqueous dispersion and added to the latex in that form.

In general, however, the results obtained in this practice were not consistently uniform to an adequate degree. This was due presumably to a variety of reasons. Principally, however, it appears to be due to the fact that the solid plasticizer cannot be readily, uniformly and sufficiently permanently dispersed in aqueous suspension. For example, a portion of the plasticizer admixed with a large amount, four to five percent, of a commercial dispersing agent would not give good, concentrated, stable suspensions, free from excessive settling. This was true even when the materials were dispersed in water by ball milling.

It is, therefore, the principal object of the present invention to overcome this problem. It is also a further principal object of the invention to prepare the plasticizer in a suitable form in which it is readily, uniformly and apparently permanently water-dispersible. Preferably, when so prepared a concentration in water of at least 50% of the plasticizer should be easily dispersed and maintained in a substantially-permanent uniform aqueous dispersion.

In general, the objects of the present invention have been readily and simply met. This is done by first reducing the physical size of the plasticizer particles to fine size range. The resultant powder is combined with a clay such as the water-swellable type of bentonite and one or more commercial surface-modifying agents. When prepared in accordance with the present invention, aqueous dispersion containing 50% or more of the plasticizers are readily prepared. They are stable and thixotropic.

Size reduction of the peptizer solids is quite important, the effectiveness of the suspension being approximately proportional to the fineness of the size. The size should be at least sufficiently small for all the particles to pass a 150 mesh screen. A minus 200 mesh size is better. To go below minus 200–250 mesh is still better but does not produce enough improvement to warrant the additional difficulty in grinding and milling. Size reduction to minus 150–250 mesh is therefore a good practice with an average at about minus 200.

Preferably, the other materials of the compositions should also be pulverulent. They need not be as finely-divided. In general, size reduction to pass a 75–150 mesh screen with an average practice at about 100 mesh is satisfactory.

Blending of the composition may be done by admixing the powdered dry materials on screens or by air mixing or by other known mechanical equivalents. The resultant mix may then be stirred into water. This is probably the best practice where the materials are to be stored before use. If so desired the mixture may be wet blended in aqueous suspension. However, the suspension must then be used per se since isolation and drying for storage of the blended reactants is not economically practical.

As noted above, the supplementary reagents comprise clays, such as bentonite, and surface-modifying agents. Bentonite of the water-swellable type is to be preferred. It may be used in various amounts. It has been found that effective results are obtained using from about 0.5 to 2.0% by weight of the composition. Preferably about 1.0 to 1.5% will be found a good general practice.

The surface-modifying agents may be varied to a considerable extent. A dispersing effect is essential but it must be accompanied by some wetting action. Not all surface-modifying agents have both properties. For example, a good dispersing agent may have little or no wetting activity. It is desirable, therefore, to use therewith a small amount of a wetting agent. Almost any of the commercially-available dispersing agents and wetting agents may be used. Among those dispersing agents which have been found satisfactory are the soluble salts of polymerized alkyl naphthalene sulfonic acids. These are commercially-available in several forms and are excellent from the point of view of dispersion. Accordingly, they are best used with some commercial type of wetting agent such as the soluble salts of alkyl sulfosuccinate, of long chain fatty-acid sulfates or of unpolymerized alkyl naphthalene sulfonic acids. Similar types are industrially well known and obtainable from various sources under varied trade names. In general, the form as salts is preferable. Usually these will be sodium salts. Any water-soluble salts may be used.

In amount, the quantity of wetting and dispersing agent may be varied to some extent. A good general practice is to use from about 2 to 4% by weight of the dry mixture with a good average practice at 2.5 to 3.5%. It is generally desirable to use a mixture of surface-modifying agents for the reasons noted above. Ordinarily the amount of dispersing agent will be much larger, from about five times the amount of wetting agent to thirty or more times, largely dependent on the wetting ability of both agents being used.

As noted in the above paragraphs, the compositions may be varied considerably. However, without necessarily limiting the invention thereto, typical blends of average practice giving good results may be illustrated by the following compositions:

| Component: | Percent by weight |
|---|---|
| (a) Peptizer (diacylaminodiphenyldisulfide) | 95.0–96.5 |
| (b) Surface-modifying agent (selected from the following): | 2.5–3.5 |
| (1) Dispersing agent such as the sodium salt of polymerized alkyl naphthalene sulfonic acid, | 2–3.5 |
| (2) Wetting agent such as: | |
| Sodium salt of isopropyl naphthalene sulfonic acid, | 0.1–0.5 |
| Dioctyl sodium sulfosuccinate, | 0.1–0.5 |
| Sodium lauryl sulfate, | 0.1–0.5 |
| (c) Water-swellable bentonite clay | 1.0–1.5 |

Such blends are found to give the desired result and to have no adverse effect on the plasticizer or its action on the rubber.

Use of the compositions of the present invention is simple. The blended peptizer is formed into an aqueous dispersion. Preferably one containing at least 50% of the plasticizer is formed. This dispersion is added to a latex of the elastomer. The solids are then coagulated, washed, and dried in the normal manner. The so-treated solids may be heat-plasticized and used in manufacture immediately. On the other hand, they may be stored, preferably as sheets, for long periods upwards of a year or more before plasticizing and used without any adverse effects on the elastomer.

The amount of aqueous dispersion to be added to the elastomer latex depends upon the nature of the elastomer. By way of illustration, enough should be used with natural rubber latex to provide about 0.025–0.5% by weight of the elastomer solids. For typical synthetic rubbers; those of the butadiene-acrylonitrile types should have about 3–5% of plasticizer added, and those of the btuadiene-styrene types should have about 1–3% added.

I claim:

1. A dry, water-dispersible rubber plasticizing composition, capable of forming a stable, thixotropic aqueous dispersible, for addition to natural or synthetic latices, containing at least 50% by weight of the disulfide plasticizer, said mixture consisting of (a) 95–96.5% by weight of a minus 150 mesh diacylaminodiphenyldisulfide of the formula:

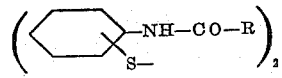

wherein R is selected from the group consisting of alkyl radicals of 2–12 carbon atoms and aryl radicals of 6–12 carbon atoms; (b) 2.5–3.5% of a minus 75 mesh water-soluble combination of a dispersing agent and wetting agent; and (c) 1.0–1.5% of minus 75 mesh water-swellable bentonite clay.

2. A composition according to claim 1 in which R is isopropyl.

3. A composition according to claim 1 in which R is butyl.

4. A composition according to claim 1 in which R is phenyl.

5. An aqueous dispersion, for addition to natural or synthetic latices, containing at least 50% by weight of disulfide plasticizer of a rubber plasticizing composition consisting of (a) 95–96.5% by weight of a minus 150 mesh diacylaminodiphenyldisulfide of the formula:

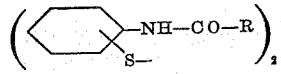

wherein R is selected from the group consisting of alkyl radicals of 2–12 carbon atoms and aryl radicals of 6–12 carbon atoms; (b) 2.5–3.5% of a minus 75 mesh water-soluble combination of a dispersing agent and wetting agent; and (c) 1.0–1.5% of minus 75 mesh water-swellable bentonite clay.

6. A composition according to claim 5 in which R is isopropyl.

7. A composition according to claim 5 in which R is butyl.

8. A composition according to claim 5 in which R is phenyl.

9. A composition according to claim 1 in which the dispersing agent is a soluble salt of a polymerized alkyl naphthalene sulfonic acid and the wetting agent is a soluble salt of a member selected from the group consisting of alkyl sulfosuccinate, long-chain fatty acid sulfates, and unpolymerized alkyl naphthalene sulfonic acids.

10. A composition according to claim 5 in which the dispersing agent is a soluble salt of a polymerized alkyl naphthalene sulfonic acid and the wetting agent is a soluble salt of a member selected from the group consisting of alkyl sulfosuccinate, long-chain fatty acid sulfates, and unpolymerized alkyl napthalene sulfonic acids.

References Cited in the file of this patent

UNITED STATES PATENTS

| 2,146,739 | Heath | Feb. 14, 1939 |
| 2,153,374 | Kantor | Apr. 4, 1939 |
| 2,399,655 | Alton | May 7, 1946 |
| 2,445,740 | Davis | July 20, 1948 |
| 2,470,945 | Paul | May 24, 1949 |